No. 844,459.
PATENTED FEB. 19, 1907.
D. McCAUSLAND.
FENDER SUPPORT.
APPLICATION FILED DEC. 8, 1906.
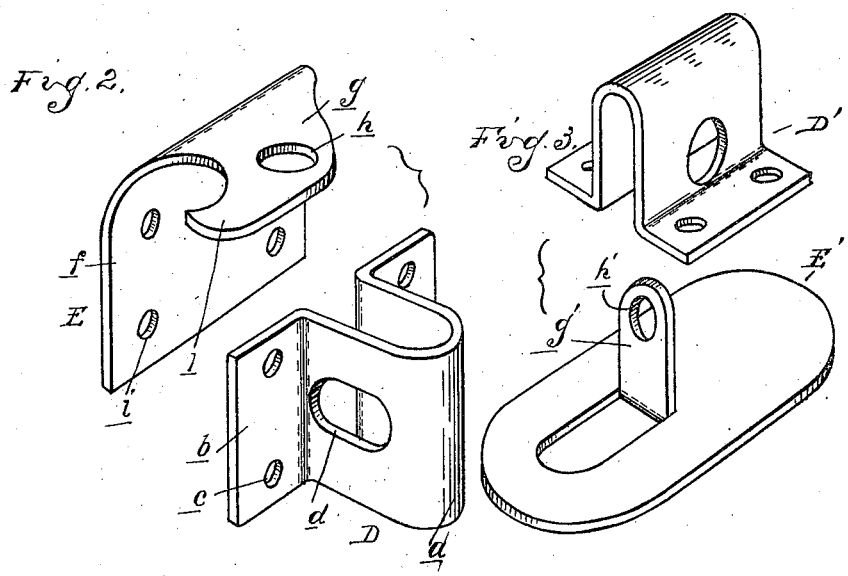
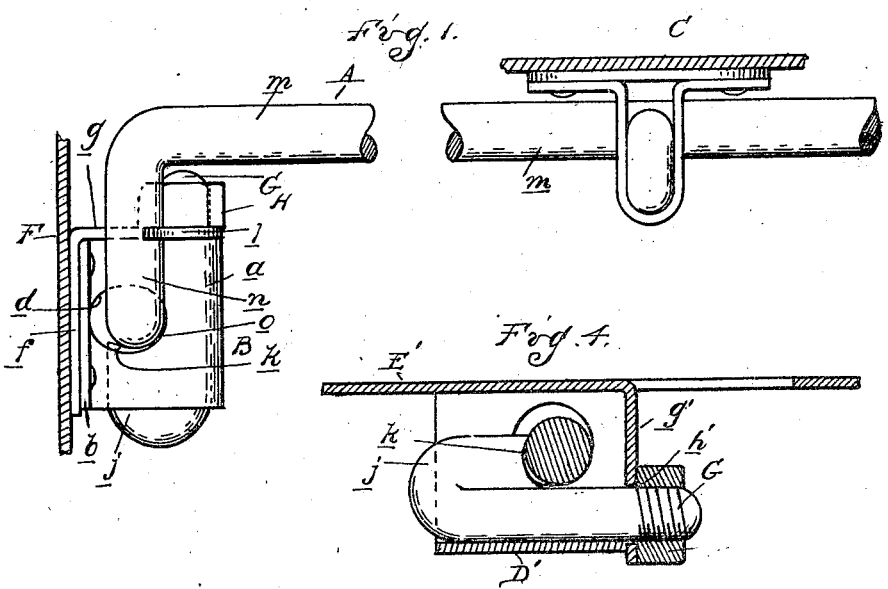
Witnesses
James P. Barry
Thos. O'Donnell
Inventor
David McCausland
By Whittemore, Hulbert & Whittemore
Attys

UNITED STATES PATENT OFFICE.

DAVID McCAUSLAND, OF DETROIT, MICHIGAN, ASSIGNOR TO CADILLAC MOTOR CAR COMPANY, OF DETROIT, MICHIGAN, A CORPORATION OF MICHIGAN.

FENDER-SUPPORT.

No. 844,459. Specification of Letters Patent. Patented Feb. 19, 1907.

Application filed December 6, 1906. Serial No. 346,881.

*To all whom it may concern:*

Be it known that I, DAVID McCAUSLAND, a citizen of the United States of America, residing at Detroit, in the county of Wayne and State of Michigan, have invented certain new and useful Improvements in Fender-Supports, of which the following is a specification, reference being had therein to the accompanying drawings.

The invention relates to supports for wheel-fenders, and has for its object the obtaining of an exceedingly simple and inexpensive construction and one which will securely hold the fender in position.

To this end the invention consists in the novel construction, as hereinafter set forth.

In the drawings, Figure 1 is an elevation of the fender-support. Fig. 2 is a perspective view of the two members constituting one of the brackets particularly designed for attachment to the sill of the vehicle. Fig. 3 is a similar view of the members of a modified construction of the bracket employed for attaching the supporting-shank to the fender, and Fig. 4 is a section through the construction of Fig. 3.

My improvement comprises a shank or arm A, which is formed from a plain bar of metal, preferably steel and preferably of round section, together with a pair of clamping-brackets B and C for respectively connecting said shank to the vehicle-frame and the fender. The brackets B and C are each formed of a pair of members struck up from sheet metal. One of these members D is formed with a return-bend or U-shape portion $a$, terminating in a pair of oppositely-extending flanges $b$, the said flanges being provided with rivet-apertures $c$ therein and the return-bend portion with transverse apertures $d$. The cooperating member of the bracket E has a flat base portion $f$ and a struck-up flange $g$, which is arranged across the end of the return-bend or U-shaped portion of the member D and is provided with the aperture $h$. These two members are assembled in the relation illustrated in Fig. 1 and are secured together by rivets passing through the apertures $c$ and registering apertures $i$ in the member E, and, if desired, the same rivets may be employed for attaching the bracket to the frame—as, for instance, the side sill F.

G is a bolt adapted to pass between the sides of the return-bend or U-shaped portion $a$ and having its threaded end passing through the aperture $h$. The opposite end of this bolt G is offset and preferably return-bent, as indicated at $j$, to form a shoulder $k$. This shoulder is so arranged when the parts are assembled as to bear against the side of the shank A when passed through the apertures $d$, and by tightening a nut H on the bolt G the said shank may be firmly clamped to the bracket.

$l$ is a hooked bearing formed in the flange $g$ for engaging the shank A.

The bracket C for attaching the shank to the fender is similar in construction to the bracket B just described, comprising the return-bend and flanged member D'. This is also provided with a member E', which has a portion $g'$ thereof struck up to abut against the end of the return-bend member D' and has an aperture $h'$ for the bolt. Thus each of the clamping-brackets B and C comprises three members—viz., an offset or return-bend bolt, a return-bend and flanged sheet-metal member between the parallel portions of which the bolt is passed and having transverse apertures for the passage of the supporting-shank, and a sheet-metal member secured to the flanges of the return-bend sheet-metal member, having a struck-up portion apertured for the passage of said bolt and forming a bearing for the clamping-nut. These three members are exceedingly simple and inexpensive to manufacture, and, furthermore, they may be used with a supporting-shank which is merely a bent bar neither forged nor machined. The clamping-brackets may be adapted for use with various sizes of supporting-shanks by making the transverse apertures $d$ of sufficient size to receive the largest shank, smaller shanks being clamped equally well therein.

As illustrated in Fig. 1, the shank A has a horizontally-extending portion $m$, vertical portion $n$, and the laterally-extending portion $o$. The portion $o$ passes through the aperture $d$ and is engaged by the clamping-bolt G, while the portion $n$ extends upward and engages the hooked bearing $l$, which holds it from turning in the clamp. This arrangement of the shank and bracket is, however, not necessary, and where desirable the bracket B may be secured to the under side of the sill, in which case the shank would extend laterally without any vertical portion. With either construction the shank is held from turning in its socket by engagement with the hooked bearing *l*.

It will be observed that the bolt G lies in the return-bend of the member D and between the same and the shank. Thus this return-bend forms a guide or bearing for the bolt which holds it from lateral displacement and retains the bearing-shoulder *k* in contact with the shank.

What I claim as my invention is—

1. A fender-support comprising a pair of members struck up from sheet metal, the one having a transversely-apertured return-bend and flanged portion, and the other having a base portion, and a portion struck up at the end of the return-bend portion and apertured substantially as, and for the purpose set forth.

2. A fender-support comprising a pair of members struck up from sheet metal, one consisting of a transversely-apertured bend portion with oppositely-extending flanges, and the other consisting of a base portion secured to said flanges, an apertured struck-up portion at the end of said return-bend portion, and having a hooked portion at one side of said return-bend portion substantially as and for the purpose set forth.

3. A fender-support comprising a member struck up from sheet metal having a transversely-apertured return-bend portion and oppositely-extending flanges, a shank passing through said transverse apertures, and a clamping-bolt in the return-bend, having a threaded portion projecting out therefrom and provided with a laterally-extending portion bearing against said shank substantially as and for the purpose set forth.

4. A fender-support comprising a member struck up from sheet metal, having a transversely-apertured return-bend portion, and oppositely-extending flanges, a shank passing through the transverse apertures in said return-bend portion, and a clamping-bolt lying between said shank and the return-bend and guided by the latter, the threaded portion of said bolt extending out from one end of the return-bend and the opposite end of said bolt being bent to form a bearing against said shank.

5. A fender-support comprising a pair of members struck up from sheet metal, one consisting of a transversely-apertured return-bend portion and oppositely-extending flanges on the other member consisting of a base portion secured to said flanges, and an apertured struck-up portion at one end of said return-bend portion, a shank extending through the transverse apertures in said return-bend portion, a clamping-bolt lying between said shank and the return-bend, and guided by the latter, the threaded end of said bolt extending out through the aperture in the second-mentioned sheet-metal member, and the opposite end of the bolt being bent to form a bearing against said shank, and a clamping-nut engaging the threaded portion of the bolt and bearing against the apertured struck-up portion through which said bolt passes.

6. A fender-support comprising a supporting shank or arm formed of a plain bar of metal and clamping-brackets for securing the opposite end of said bar respectively to the fender and vehicle-frame, each of said brackets comprising a struck-up sheet-metal member having a transversely-apertured return-bend portion, and oppositely-extending securing-flanges and a bolt lying and guided in the return-bend of said member having its threaded portion extending out from the end thereof and its opposite end bent to form a bearing against said supporting-arm when passed through said transverse aperture in the return-bend member.

7. A fender-support comprising a shank or supporting-arm formed of a plain bar of metal of round cross-section, a bracket for securing said arm or shank to the vehicle-frame comprising a sheet-metal member having a transversely-apertured return-bend portion and oppositely-extending securing-flanges, a securing-bolt extending between the sides of the return-bend portion and bearing against said shank when passed through the transverse apertures in said return-bend portion, said shank being bent, having a portion extending parallel to said return-bend portion, and a hooked bearing for engaging said parallel portion of the shank to hold the same from turning in the transverse apertures.

In testimony whereof I affix my signature in presence of two witnesses.

DAVID McCAUSLAND.

Witnesses:
AMELIA WILLIAMS,
NELLIE KINSELLA.